J. S. Dickason,
Cotton Planter.
No. 109,499.  Patented Nov. 22, 1870.
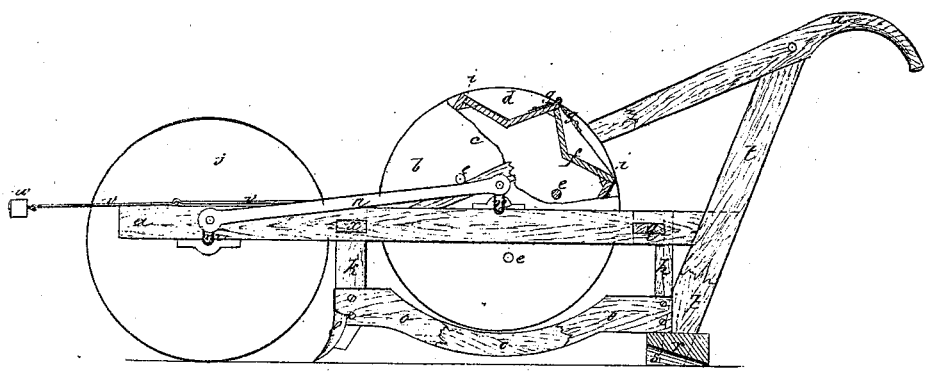
Witnesses:  Inventor:
            John S. Dickason
            PER Munn & Co
            Attorneys.

United States Patent Office.

JOHN S. DICKASON, OF SULPHUR WELL, TENNESSEE.

Letters Patent No. 109,499, dated November 22, 1870.

IMPROVEMENT IN COTTON-PLANTERS.

The Schedule referred to in these Letters Patent and making part of the same.

*To all whom it may concern:*

Be it known that I, JOHN S. DICKASON, of Sulphur Well, in the county of Shelby and State of Tennessee, have invented a new and improved Cotton-Planter; and I do hereby declare the following to be a full, clear, and exact description of the same, reference being had to the accompanying drawing making a part of this specification, in which the figure is a side elevation, with partial sectional views.

This invention relates to an improvement in cotton-planters; and consists in the arrangement of parts hereinafter described.

In the drawing—

$a$ is the stock or frame.

$b$ is the seed-box, constructed polygonal, and provided with the disks $c$ and $d$, secured to its end by rods, $e$, having heads at one end and nuts and screws at the other.

$f$ is a lid, through which the seed is introduced to the seed-box $b$, $g$ being one of the hinges and $h$ the hook and staple which secure it.

A discharge-orifice, $i$, is made in the longitudinal center of each angle of the seed-box $b$.

$j$, the leading-wheel.

$k$ is the share-beam, to which the furrower $l$ is secured.

$m$ is a crank at each end of the shaft on which the leader-wheel $j$ revolves.

The seed-box $b$ is provided with a similar crank, $n$.

$o$ is the guide, consisting of two pieces, secured through their ends one to each side of the share-beam $k$ and upright $p$.

The upright $p$ is secured to the cross-piece $q$ of the frame $a$ and to the coverer $r$.

The coverer $r$ has the curved recess $s$ on its side, and is mortised to the uprights $t$ of the frame.

$n$ $n$ are the pitmen, one on each side of the frame; and $v$ are the links connecting the frame $a$ and the bar $u$, to which the whiffletree is attached.

The links $v$ are fastened to the beams of the frame as far back as the cross-piece $x$, so that, when the planter approaches a stump or tree, the horse can be turned so as to avoid it, and the planter can be run almost against it, for the purpose of planting the seed.

The leading-wheel $j$ communicates motion through the pitmen $n$ to the seed-box $b$. As the latter revolves it discharges the seed through the discharge-orifice $i$ into the furrow made by the furrower $l$, the guide $i$ keeping the furrow open until the seed is discharged, when the coverer $r$ follows after and covers it.

Having thus described my invention,

What I claim as new, and desire to secure by Letters Patent, is—

The seed-box $b$, provided with the cranks $n$, lid $f$, rods $e$, and discharge-orifices $i$, the leading-wheel $j$, provided with cranks $m$, the pitmen $n$, guide $o$, and coverer $r$, arranged relatively one to the other, and to the frame $a$, in the manner and for the purpose specified.

JOHN S. DICKASON.

Witnesses:
J. M. BOND,
J. W. BOND.